United States Patent [19]
Weingarden

[11] Patent Number: 5,938,019
[45] Date of Patent: Aug. 17, 1999

[54] POINT-OF-PURCHASE DISK HOLDER

[76] Inventor: Marshall L. Weingarden, 292 Myrtle St., Haworth, N.J. 07641

[21] Appl. No.: 08/724,411

[22] Filed: Oct. 1, 1996

[51] Int. Cl.⁶ .................................................... B65D 85/57
[52] U.S. Cl. ........................ 206/308.1; 206/312; 206/309
[58] Field of Search ................................ 206/308.1, 307, 206/309, 310, 311.313, 232, 387.13, 472–475, 275, 308.3, 444, 450; 383/39, 40

[56] References Cited

U.S. PATENT DOCUMENTS

| | | | |
|---|---|---|---|
| 4,549,658 | 10/1985 | Sfikas ........................................ | 206/311 |
| 4,640,413 | 2/1987 | Kaplan et al. ............................ | 206/232 |
| 4,850,731 | 7/1989 | Youngs .................................... | 206/312 |
| 5,188,229 | 2/1993 | Bernstein ................................. | 206/309 |
| 5,445,265 | 8/1995 | Herr et al. ............................... | 206/308.1 |
| 5,690,220 | 11/1997 | Swan .................................... | 206/308.1 |

*Primary Examiner*—Paul P. Gordon
*Attorney, Agent, or Firm*—Arthur Jacob

[57] ABSTRACT

A holder secures a disk to a backer member at a point of purchase, with the disk retained in the holder while providing an indication of any tampering to access the disk in the holder, the holder including a back sheet, a front sheet juxtaposed with the back sheet and joined with the back sheet, a pouch between the joined front sheet and back sheet, the pouch having an access opening for selective removal of the disk from the pouch and selective re-insertion of the disk into the pouch, a loading opening in the back sheet for enabling insertion of the disk into the pouch through the loading opening, an adhesive layer along the back sheet for securing the back sheet to the backer member with the backer member closing off the loading opening such that upon securement of the back sheet to the backer member selective removal of the disk from the pouch is accomplished only through the access opening of the pouch, a flap joined to the assembled front sheet and back sheet and overlapping the front sheet to close the access opening, and a closure seal securing the flap to the assembled front sheet and back sheet along portions of the flap so located that access to the disk through the access opening requires a visible breaking of the closure seal, such that a visible broken closure seal is indicative of tampering to gain access to the disk.

15 Claims, 3 Drawing Sheets

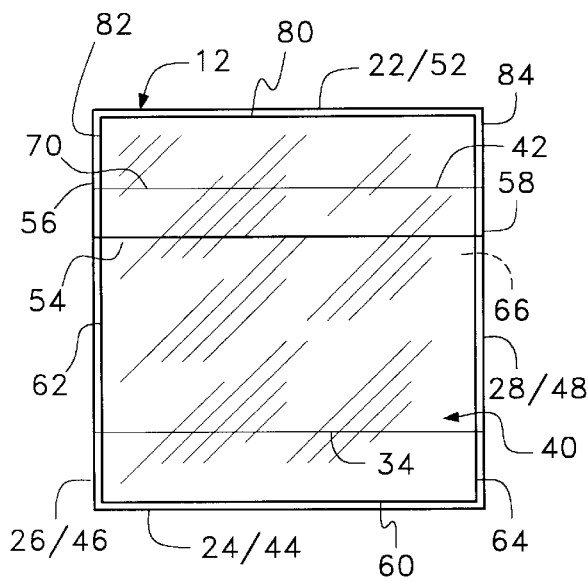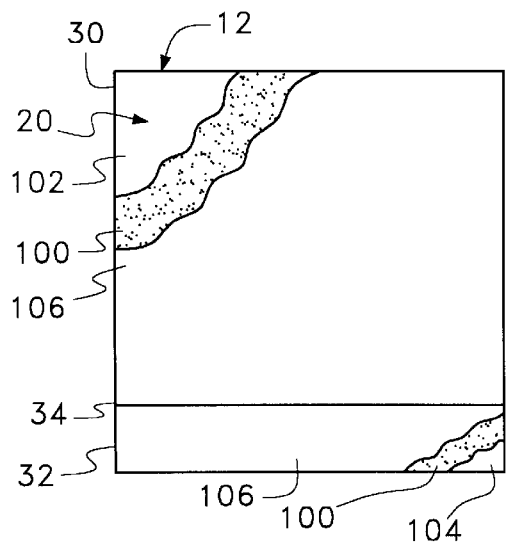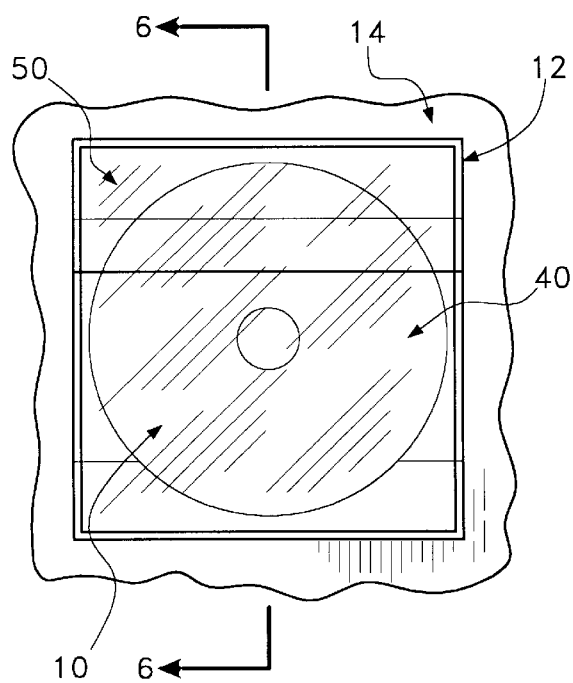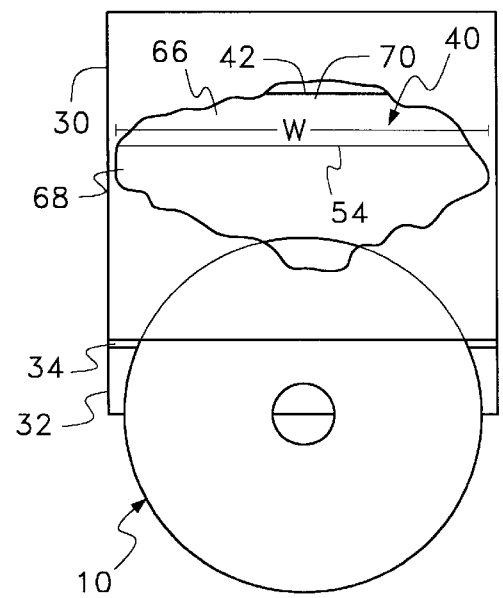
Fig. 2
Fig. 3
Fig. 5
Fig. 4

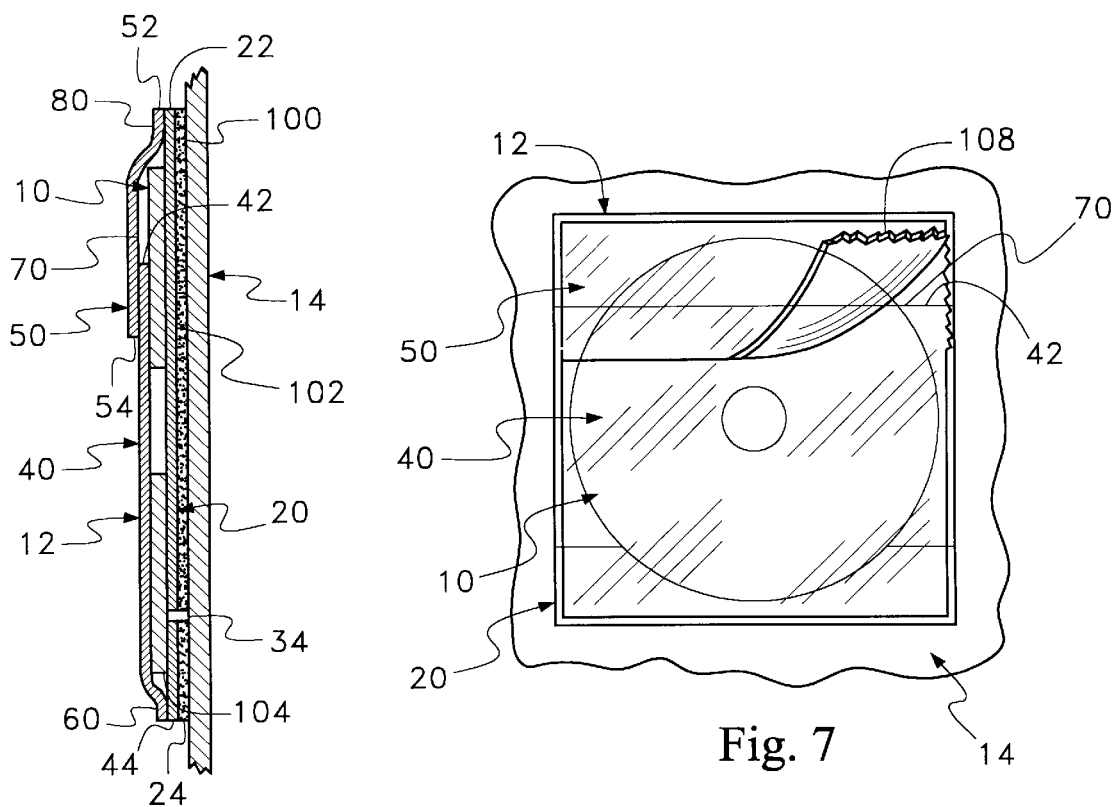
Fig. 6
Fig. 7
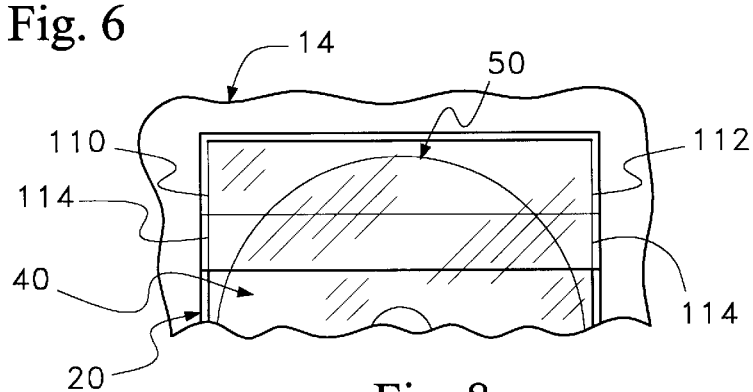
Fig. 8
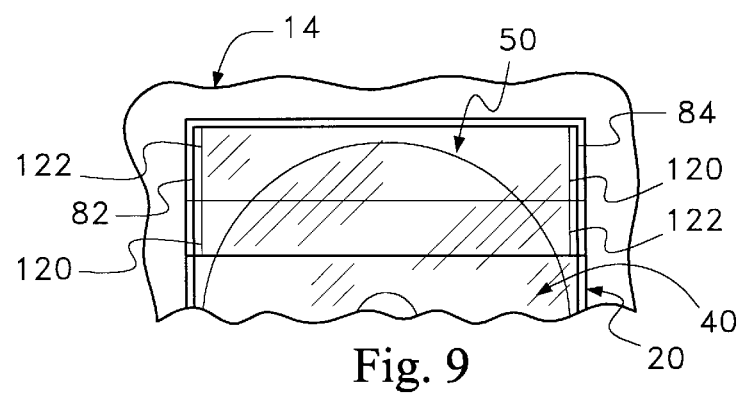
Fig. 9

POINT-OF-PURCHASE DISK HOLDER

The present invention relates generally to the presentation of information and data-bearing disks at a point of purchase and pertains, more specifically, to a disk holder in which such a disk is displayed for sale, while retained in the holder with the provision of an indication of any tampering to access the disk prior to purchase.

Currently, the medium of choice for disseminating information and data, such as computer programs and data bases for use with computers, is the information and data-bearing optical disk, the most commonly available optical disk being known as the compact disc. Further, compact discs are employed for disseminating data for entertainment, usually in the form of sound and video. Compact discs commonly are displayed for sale in pouches which house a disc securely at the point of purchase while enabling the disc to be viewed by a prospective purchaser. In addition, information and data are disseminated on magnetic disks, known as floppy disks, which may be displayed in a similar manner. In making a selection, the purchaser wishes to be assured that the disk has remained sealed within the pouch and has not been tampered with prior to purchase. Further, secure display will discourage theft of the disk. In addition, in many instances where the disk bears a computer program, the purchaser will acknowledge the acceptance of certain conditions and restrictions in the use of the disk and the computer program by opening the package containing the disk. A reliable indication that the package has indeed been opened and the disk has been accessed would be of value to vendors in determining the status of a purchaser, especially with respect to eligibility for return privileges.

The present invention provides a disk holder which appropriately presents a disk for sale at a point of purchase, sealed within the holder, and enables a purchaser or a vendor to determine visibly if the sealed holder has been subject to any tampering or if the disk has been accessed either prior to sale or subsequent to sale, as when the disk is presented for return to the vendor. As such, the present invention attains several objects and advantages, some of which are summarized as follows: Provides a disk holder with a pouch, usually transparent, within which the disk is sealed for display at a point of purchase, while providing a reliable indication of the integrity of the seal for purposes of detecting any tampering or access to the disk prior to sale; Allows a visible determination of the status of any agreement by a purchaser to conditions or restrictions pertaining to use of the disk, and the information and data on the disk, by virtue of opening access to the disk; enables simplified manufacture and use of a disk holder having a reliable visual indicator of tampering, thereby serving to deter theft; allows ease of loading the disk into the holder for subsequent display at a point of purchase; provides a disk holder having a relatively rugged construction capable of widespread use over a long service life; enables increased versatility in the packaging and display of disks at a point of purchase; fosters customer confidence in that package integrity is confirmed readily at the point of purchase; enables ready determination by a vendor, upon presentation of the package for return, that package integrity has either been maintained or breached; provides a re-usable package for holding a disk conveniently, while protected against dust and damage; enables ready incorporation of a disk holder into a wide variety of display and storage arrangements; provides a disk holder capable of economical manufacture in large numbers of uniform high quality.

The above objects and advantages, as well as further objects and advantages, are attained by the present invention which may be described briefly as a holder for securing a disk to a backer member at a point of purchase, with the disk retained in the holder while providing an indication of any tampering to access the disk in the holder, the holder comprising: a back sheet having a perimeter including a top edge, a bottom edge longitudinally opposite the top edge, and laterally opposite side edges; a front sheet juxtaposed with the back sheet and joined with the back sheet adjacent a portion of the perimeter of the back sheet to assemble the front sheet with the back sheet and establish a pouch between the assembled front sheet and back sheet, the pouch having an interior and an access opening adjacent a further portion of the perimeter of the back sheet, the access opening providing access to the interior of the pouch and to the disk within the pouch for selective removal of the disk from the pouch and selective re-insertion of the disk into the pouch; the pouch including a loading opening in the back sheet, the loading opening communicating with the interior of the pouch for enabling insertion of the disk into the pouch through the loading opening; securing means adjacent the loading opening for securing the back sheet to the backer member with the backer member closing off the loading opening such that upon securement of the back sheet to the backer member by the securing means selective removal of the disk from the pouch is accomplished only through the access opening of the pouch; a flap joined to the assembled front sheet and back sheet adjacent the further portion of the perimeter of the back sheet and extending longitudinally close access to the disk within the interior of the pouch for selective removal of the disk through the access opening; and a closure seal securing the flap to the assembled front sheet and back sheet along portions of the flap so located that access to the disk within the interior of the pouch for selective removal of the disk through the access opening requires a visible breaking of the closure seal, such that a visible broken closure seal is indicative of tampering.

The invention will be understood more fully, while still further objects and advantages will become apparent, in the following detailed description of preferred embodiments of the invention illustrated in the accompanying drawing, in which:

FIG. 2 is a front elevational view of an assembled disk holder;

FIG. 3 is a rear elevational view of the assembled disk holder;

FIG. 4 is a rear elevational view similar to FIG. 3, showing a disk being inserted into the disk holder;

FIG. 5 is a front elevational view of the disk holder secured to a backer member, with a disk placed in the disk holder;

FIG. 6 is an enlarged cross-sectional view taken along line 6—6 of FIG. 5;

FIG. 7 is a front elevational view similar to FIG. 5, and illustrating the manner in which the disk is accessed;

FIG. 8 is a fragmentary front elevational view of a portion of a disk holder similar to that shown in FIG. 5, and illustrating an alternate construction; and FIG. 9 is a fragmentary front elevational view similar to FIG. 8, and illustrating another alternate construction.

Figure 1:
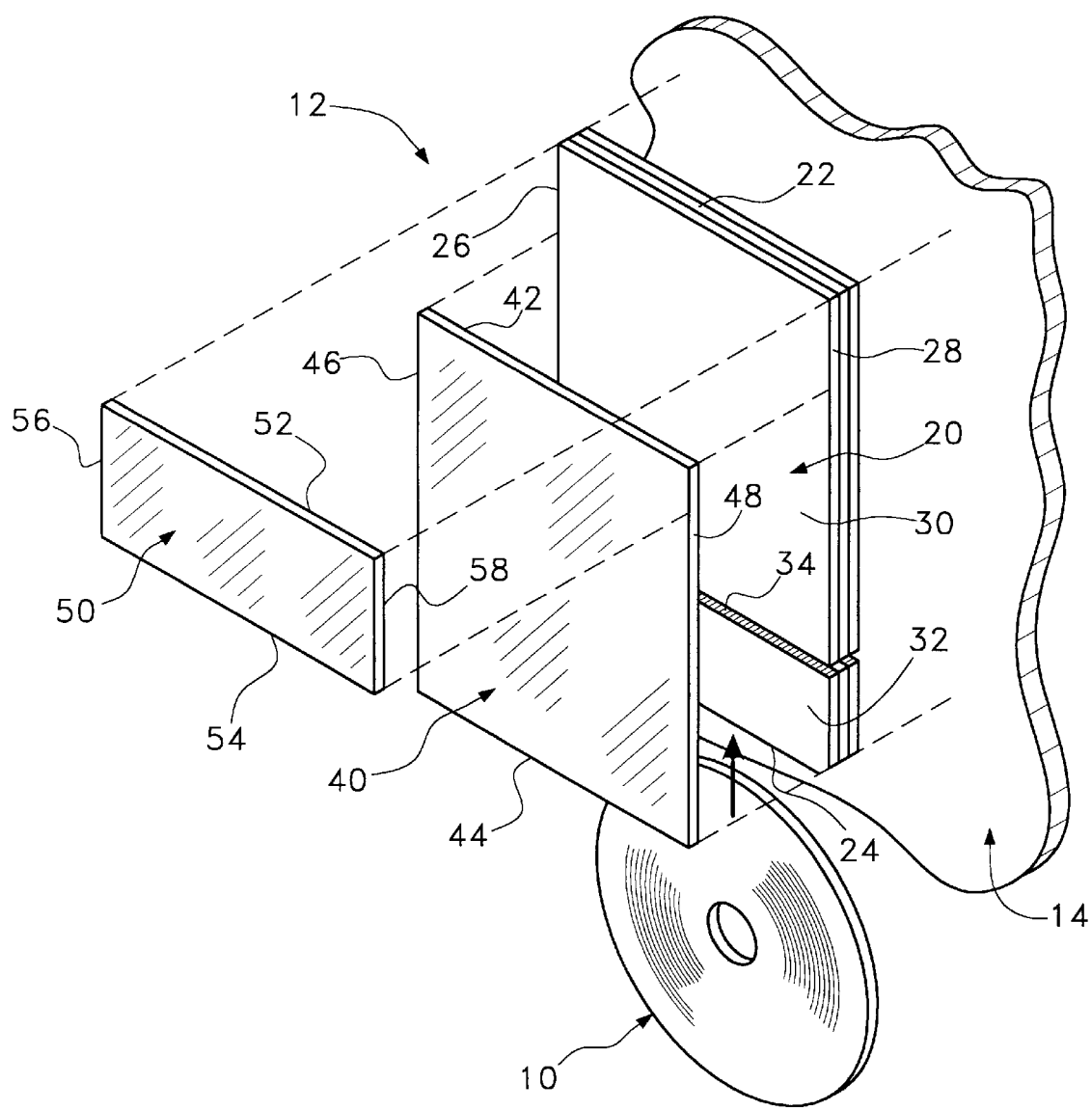
FIG. 1 is an exploded perspective view of a disk holder constructed in accordance with the present invention, and a disk to be held within the holder.

Referring now to the drawing, and especially to FIG. 1 thereof, an information and data-bearing disk illustrated in the form of a compact disc 10 is to be retained in a disk holder 12 which, in turn, is to be secured to a backer member 14 for display at a point of purchase. Disk holder 12 includes a back sheet 20 having a perimeter including a top edge 22, a bottom edge 24 longitudinally opposite the top edge 22 and spaced from the top edge 22 by an overall longitudinal length between the top and bottom edges 22 and 24, and laterally opposite side edges 26 and 28 spaced apart by a lateral width between the side edges 26 and 28. In the illustrated embodiment, the back sheet 20 is divided into an upper section 30 and a lower section 32, with a split 34 located between the upper and lower sections 30 and 32. In the preferred construction, the longitudinal length of the upper section 30, between the top edge 22 and the split 34, is substantially greater than the longitudinal length of the lower section 32, between the split 34 and the bottom edge 24, thus placing the split 34 adjacent the bottom edge 24.

A front sheet 40 is to be juxtaposed with the back sheet 20 and has a perimeter including a top edge 42, a bottom edge 44 longitudinally opposite the top edge 42, and laterally opposite side edges 46 and 48. The lateral width of the front sheet 40 between the side edges 46 and 48 is essentially the same as the lateral width of the back sheet 20; however, the longitudinal length of the front sheet 40 between the top edge 42 and the bottom edge 44 is less than the longitudinal length of the back sheet 20, for reasons which will be set forth in detail below.

A flap 50 is to be juxtaposed with the back sheet 20 and the front sheet 40, adjacent the top edges 22 and 42. Flap 50 includes a top edge 52, a longitudinally opposite bottom edge 54 spaced from the top edge 52 to establish a longitudinal length between the top edge 52 and the bottom edge 54, and laterally opposite side edges 56 and 58 spaced apart by a lateral width which is essentially the same as the lateral width of the back sheet 20 and the lateral width of the front sheet 40.

Back sheet 20, front sheet 40 and flap 50 preferably are each constructed of a transparent synthetic polymeric material, one such material being polypropylene, of the type which enables joining of the sheets 20, 40 and 50 by conventional sealing techniques such as, for example, heat or ultrasonic welding, to assemble the disk holder 12. Thus, as seen in FIGS. 2 and 3, front sheet 40 is juxtaposed with back sheet 20 with the sheets 20 and 40 joined along bottom edges 24 and 44 by a weld 60, and joined along corresponding side edges 26, 46 and 28, 48 by welds 62 and 64, respectively, to establish a pouch 66 within the assembled sheets 20 and 40, the pouch 66 having an interior 68 located between the sheets 20 and 40 (see FIG. 6). The top edge 42 of the front sheet 40 is spaced downwardly from the top edge 22 of the back sheet 20 to establish an access opening 70 communicating with the interior 68 of the pouch 66 adjacent the upper portion of the perimeter of the back sheet 20. The bottom edge 44 of the front sheet 40 is coincident with the bottom edge 24 of the back sheet 20 so that the front sheet 40 straddles the split 34 between the upper and lower sections 30 and 32 of the back sheet 20 and integrates the upper and lower sections 30 and 32 into the assembled disk holder 12.

Flap 50 is juxtaposed with the front and back sheets 40 and 20 and is placed adjacent the front sheet 40, with the top edge 52 of the flap 50 extending along the top edge 22 of the back sheet 20, the top edge 52 of the flap 50 being joined to the top edge 22 of the back sheet 20 by a weld 80. In the preferred arrangement, the longitudinal length of the flap 50 is greater than the longitudinal spacing between the top edge 22 of the back sheet 20 and top edge 42 of the front sheet 40 so that the flap 50 overlaps the front sheet 40 and closes the access opening 70. Further welds 82 and 84 along the side edges 56 and 58, respectively, of the flap 50 join the side edges 56 and 58 of the flap 50 to the assembled front sheet 40 and back sheet 20 to form closure seals which maintain the access opening 70 closed.

Once the back sheet 20, the front sheet 40 and the flap 50 are assembled and joined together to establish the closed pouch 66, the disc 10 is inserted into the pouch 66, as seen in FIG. 4. The lateral width W of the pouch 66, and the lateral extent of the split 34 are such that the disc 10 readily is slipped through the split 34 into the pouch 66, the split 34 thus providing a loading opening through which the disk holder 12 is loaded with a disc 10. When the disc 10 is fully within the pouch 66 of the disk holder 12, as illustrated in FIGS. 5 and 6, the back sheet 20 is secured to the backer member 14, preferably by means of a layer 100 of pressure sensitive adhesive, which layer 100 extends over the rear surfaces 102 and 104 of the sections 30 and 32, respectively, of the back sheet 20. The backer member 14 may be a header card or a display board for displaying the disc 10 at a point of purchase location, or the backer member 14 can be a cover or a page of a user's manual, or another part of a book-like item within which the disc 10 is sold. The layer 100 of pressure-sensitive adhesive usually is applied to the back sheet 20 prior to assembly of the back sheet 20 with the front sheet 40 and the flap 50, and a release sheet 106 is placed over the layer 100 in a now well known manner.

Adhesion of the sections 30 and 32 of the back sheet 20 to the backer member 14 subsequent to loading the disc 10 in the pouch 66 of the disk holder 12 closes off the loading opening provided by the split 34 so that the disc 10 is sealed within the interior 68 of the pouch 66. Access to the disc 10 now is through the access opening 70, which access opening 70 is closed by the flap 50. In order to gain access to the disc 10, the flap 50 is pulled away from the assembled front sheet 40 and back sheet 20 by tearing the further welds 82 and 84 to open the closure seals formed by the further welds 82 and 84, as seen in FIG. 7, until the access opening 70 is opened for access to the disc 10. Since the broken closure seals resulting from the torn further welds 82 and 84 are visually quite evident, as illustrated along torn edge 108, any opening of the access opening 70 becomes quite visible. Should such opening be unauthorized, the visible broken closure seals are indicative of tampering. Further, such visual evidence of tampering will deter theft. In addition, in those instances where disc 10 bears a computer program, the purchaser will acknowledge the acceptance of certain conditions and restrictions in the use of the disc and the computer program by opening the package containing the disc. The torn edge 108 then becomes a reliable indication that the package has indeed been opened and the disc 10 has been accessed, rendering such a visible indication of value to vendors in determining the status of a purchaser, especially with respect to eligibility for return privileges.

The resilient nature of the material of the flap 50, coupled with the manner in which the flap 50 is joined with the assembled back sheet 20 and front sheet 40, enables the disk holder 12 to be reused effectively after the closure seals, provided by the further welds 82 and 84, are broken. Thus, disc 10 is selectively removed from pouch 66 for use and is selectively re-inserted into pouch 66, through access opening 70, for storage of the disc 10 when the disc 10 is not in use. By extending the flap 50 to overlap the front sheet 40, the interior 68 of the pouch 66 is closed to protect the disc 10 against dust and damage.

In the alternate arrangement illustrated in FIG. 8, the further welds 110 and 112 which secure the flap 50 to the assembled front sheet 40 and back sheet 20 are intermittent so as to weaken the closure seals slightly and thereby facilitate tearing of the further welds 110 and 112 along weakened portions 114 to lift the flap 50 and open access to the pouch 66.

In the further alternate arrangement shown in FIG. 9, the closure seals include a line of intermittent welds 120 located next to each further weld 82 and 84, the intermittent welds 120 extending along the flap 50 to establish weakened portions 122 adjacent the further welds 82 and 84. Lifting of the flap 50 is accomplished readily by tearing the intermittent welds 120, by virtue of the weakened portions 122, to break the closure seals which secure the flap 50 in the closed condition.

It will be seen that the present invention attains the objects and advantages summarized above, namely: Provides a disk holder with a pouch, usually transparent, within which the disk is sealed for display at a point of purchase, while providing a reliable indication of the integrity of the seal for purposes of detecting any tampering or access to the disk prior to sale; Allows a visible determination of the status of any agreement by a purchaser to conditions or restrictions pertaining to use of the disk, and the information and data on the disk, by virtue of opening access to the disk; enables simplified manufacture and use of a disk holder having a reliable visual indicator of tampering, thereby serving to deter theft; allows ease of loading the disk into the holder for subsequent display at a point of purchase; provides a disk holder having a relatively rugged construction capable of widespread use over a long service life; enables increased versatility in the packaging and display of disks at a point of purchase; fosters customer confidence in that package integrity is confirmed readily at the point of purchase; enables ready determination by a vendor, upon presentation of the package for return, that package integrity has either been maintained or breached; provides a re-usable package for holding a disk conveniently, while protected against dust and damage; enables ready incorporation of a disk holder into a wide variety of display and storage arrangements; provides a disk holder capable of economical manufacture in large numbers of uniform high quality.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A holder for securing a disk to a backer member at a point of purchase, with the disk retained in the holder while providing an indication of any tampering to access the disk in the holder, the holder comprising:

a back sheet having a perimeter including a top edge, a bottom edge longitudinally opposite the top edge, and laterally opposite side edges;

a front sheet juxtaposed with the back sheet and joined with the back sheet adjacent a portion of the perimeter of the back sheet to assemble the front sheet with the back sheet and establish a pouch between the assembled front sheet and back sheet, the pouch having an interior and an access opening adjacent a further portion of the perimeter of the back sheet, the access opening providing access to the interior of the pouch and to the disk within the pouch for selective removal of the disk from the pouch and selective re-insertion of the disk into the pouch;

the pouch including a loading opening in the back sheet, the loading opening communicating with the interior of the pouch for enabling insertion of the disk into the pouch through the loading opening;

securing means adjacent the loading opening for securing the back sheet to the backer member with the backer member closing off the loading opening such that upon securement of the back sheet to the backer member by the securing means selective removal of the disk from the pouch is accomplished only through the access opening of the pouch;

a flap joined to the assembled front sheet and back sheet adjacent the further portion of the perimeter of the back sheet and extending longitudinally close access to the disk within the interior of the pouch for selective removal of the disk through the access opening; and a closure seal securing the flap to the assembled front sheet and back sheet along portions of the flap so located that access to the disk within the interior of the pouch for selective removal of the disk through the access opening requires a visible breaking of the closure seal, such that a visible broken closure seal is indicative of tampering.

2. The invention of claim 1 wherein the loading opening includes a split in the back sheet, the back sheet includes sections located along the split, and the securing means is located along the back sheet for securing the sections to the backer member to close the split against removal of the disk from the pouch through the split.

3. The invention of claim 2 wherein each section includes a rear surface outside the pouch, and the securing means includes a layer of adhesive on the rear surface of each section.

4. The invention of claim 2 wherein the split extends laterally across the back sheet between the side edges of the back sheet, and the sections include an upper section located between the top edge of the back sheet and the split, and a lower section located between the split and the bottom edge of the back sheet.

5. The invention of claim 4 wherein each of the upper section and the lower section includes a rear surface outside the pouch, and the securing means includes a layer of adhesive on the rear surface of each section.

6. The invention of claim 4 wherein the split is located adjacent the bottom edge of the back sheet.

7. The invention of claim 6 wherein the access opening is located adjacent the top edge of the back sheet.

8. The invention of claim 7 wherein the top edge of the front sheet is spaced longitudinally downwardly from the top edge of the back sheet and the access opening is located between the top edge of the front sheet and the top edge of the back sheet.

9. The invention of claim 8 wherein the further portion of the perimeter of the back sheet is located along the top edge of the back sheet and the flap extends downwardly from the top edge of the back sheet to overlap the top edge of the front sheet and close the access opening.

10. The invention of claim 9 wherein the flap includes laterally opposite side edges juxtaposed with the side edges of the assembled back sheet and front sheet, and the closure seal includes welds securing the flap to the assembled back sheet and front sheet adjacent the side edges of the flap.

11. The invention of claim 10 wherein the welds extend intermittently along the flap.

12. The invention of claim 10 including weakened portions in the flap extending along the flap adjacent the welds.

13. The invention of claim 1 wherein the flap includes laterally opposite side edges juxtaposed with the side edges of the assembled back sheet and front sheet, and the closure seal includes welds securing the flap to the assembled back sheet and front sheet adjacent the side edges of the flap.

14. The invention of claim 13 wherein the welds extend intermittently along the flap.

15. The invention of claim 13 including weakened portions in the flap extending along the flap adjacent the welds.

* * * * *